US008861702B2

(12) United States Patent
Simoes et al.

(10) Patent No.: US 8,861,702 B2
(45) Date of Patent: Oct. 14, 2014

(54) CONFERENCE ASSISTANCE SYSTEM AND METHOD

(75) Inventors: Renato Simoes, Fortaleza-CE (BR); Brian Hillis, Centennial, CO (US); Pier Angelo Tognini Filho, Gioania-GO (BR)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/353,102

(22) Filed: Jan. 18, 2012

(65) Prior Publication Data

US 2012/0163568 A1    Jun. 28, 2012

Related U.S. Application Data

(63) Continuation-in-part of application No. 12/977,260, filed on Dec. 23, 2010, now Pat. No. 8,306,205.

(51) Int. Cl.
*H04M 3/42* (2006.01)
*H04M 3/56* (2006.01)

(52) U.S. Cl.
CPC ........ *H04M 3/56* (2013.01); *H04M 2203/5054* (2013.01); *H04M 3/42059* (2013.01); *H04M 2201/38* (2013.01)
USPC ................... 379/202.01; 370/260; 348/14.09; 709/204; 709/206

(58) Field of Classification Search
USPC .............. 379/202.01; 709/204, 206; 370/260; 348/14.09
See application file for complete search history.

(56) References Cited

U.S. PATENT DOCUMENTS

| | | | |
|---|---|---|---|
| 2008/0101577 A1* | 5/2008 | Frankel | 379/202.01 |
| 2009/0213207 A1* | 8/2009 | Shah et al. | 348/14.09 |
| 2011/0271332 A1* | 11/2011 | Jones et al. | 726/7 |

* cited by examiner

Primary Examiner — Simon King

(57) ABSTRACT

A conference manager detects that a communication has been initiated between a communication device and conferencing system. A user of the conferencing system is identified. For example, the user can be identified by using the caller ID of the person who initiated the communication. In response to identifying the user of the conferencing system, the conference manager gets a list of conferences in which the user is scheduled to participate. The list can include one or more conferences. The list of conferences is sent to an application running on the communication device and displayed to the user. Once a conference from the list is selected by the user, the communication manager receives information that identifies the selected conference and the user is connected to the selected conference. As the user is connected to the conference, different progress messages can be sent and displayed to the user.

20 Claims, 5 Drawing Sheets

CONFERENCE ASSISTANCE SYSTEM AND METHOD

CROSS-REFERENCE TO RELATED APPLICATIONS

This Continuation-in-Part application filed under 37 C.F.R. §1.53(b) claims the benefit under 35 U.S.C. §120 to U.S. patent application Ser. No. 12/977,260, filed Dec. 23, 2010, entitled "APPARATUS AND METHOD FOR OPERATING A CONFERENCE ASSISTANCE SYSTEM," which is incorporated herein by reference.

TECHNICAL FIELD

The system and method relates to conferencing systems and in particular to interfaces for simplifying access to conferencing systems.

BACKGROUND

Currently, there are a variety of conferencing systems that allow a user to dial into and set up an audio or video conference. For example, solutions exist that allow users to dial into a common number and create a conference. Once the conference host logs in and provides the host code, a conference is set up with any participants who have already dialed in (or dial in later) and have provided the appropriate participant code that corresponds with the host code.

One of the problems with these types of systems is that a participant/host may not always remember their host code/participant code. This results in the user having to go back and look up the conference information in an email/calendaring system to determine the host code/participant code. This method not only takes additional time, but also results in other problems. For example, the person may not be in their office and may not have access to the email/calendaring system. In this instance, the participant may not be able to access the conference information. What is needed is a solution that is not only simple, but also secure.

SUMMARY

The system and method are directed to solving these and other problems and disadvantages of the prior art. A conference manager detects that a communication has been initiated between a communication device and a conferencing system. A user of the conferencing system is identified. For example, the user can be identified by using the caller ID of the person who initiated the communication. In response to identifying the user of the conferencing system, the conference manager gets a list of conferences in which the user is scheduled to participate. The list can include one or more conferences.

The list of conferences is sent to an application running on the communication device and displayed to the user. Once a conference from the list is selected by the user, the communication manager receives information that identifies the selected conference and the user is connected to the selected conference. As the user is connected to the conference, different progress messages can be sent and displayed to the user.

In other embodiments, detecting that the communication has been initiated is accomplished external to the conferencing system.

In yet another embodiment, an audio communication channel is established and the progress messages are also sent audibly to the user.

In still different embodiments, identification of the user can be accomplished in various ways. For example, by using an Automatic Identification Number (ANI), an address, a voice print, a digital certificate, and/or an access code.

Still other embodiments include the conference manager running on the communication device.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
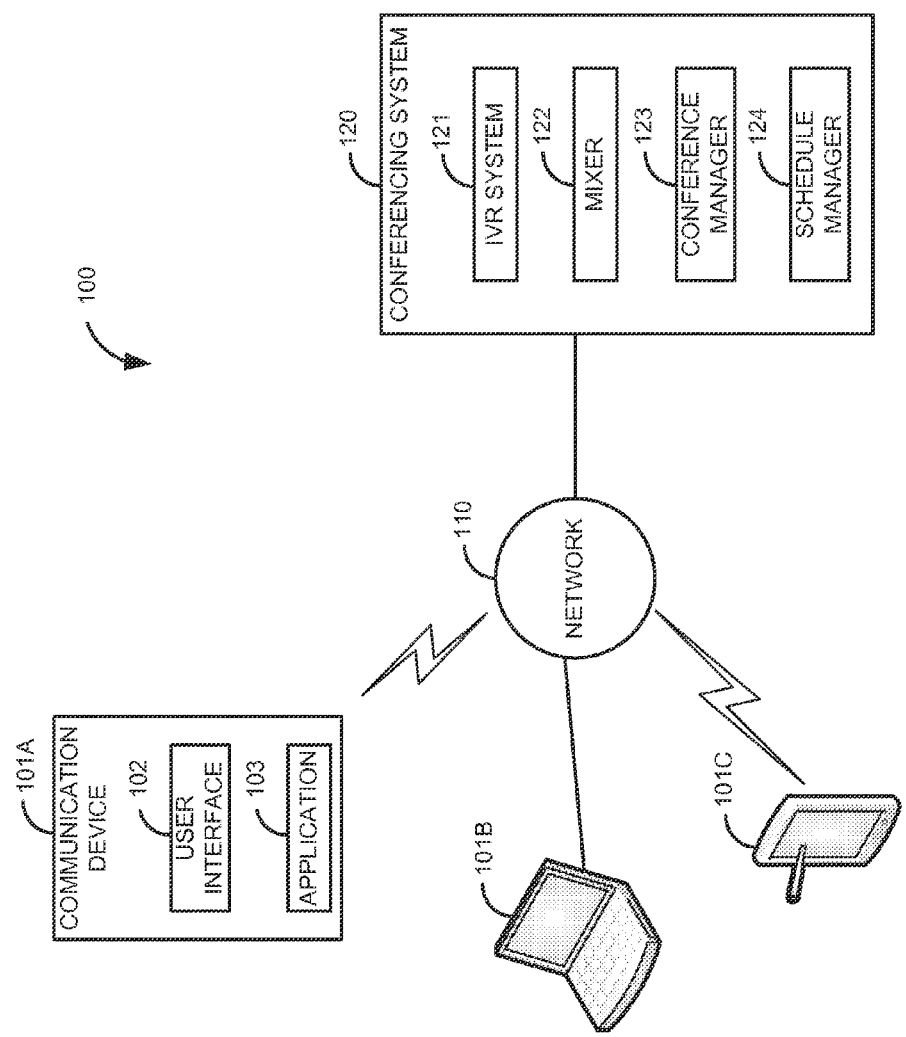
FIG. 1 is a block diagram of a first illustrative system for providing conferencing services.

FIG. 1 is a block diagram of a first illustrative system 100 for providing conferencing services. First illustrative system 100 comprises communication devices 101A-101C, network 110, and conferencing system 120.

Communication devices 101A-101C can be any type of device that can communicate on network 110, such as a personal computer (PC), a laptop computer, a cellular telephone, a tablet device, a telephone, a smart phone, a Personal Digital Assistant (PDA), a recording system, and the like. Communication device 101A further comprises user interface 102 and application 103. User interface 102 can be any type of interface that allows a user to access/control communication device 101A. For example, user interface 102 can comprise a touch screen, a Liquid Crystal Display (LCD), a plasma display, a Cathode Ray Tube (CRT), a mouse, a trackball device, a joystick, and the like. Although not shown, communication devices 101B-101C may also comprise some type of user interface 102 that allows access respectively to communication devices 101B-110C. Application 103 is an application that runs on communication device 101A and communicates with conferencing system 120. Communication devices 101B-101C may also comprise application 103, but do not necessarily have to include application 103.

Network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), H.232, Integrated Services Digital Network (ISDN), and the like.

Conferencing system 120 can be any type of conferencing system that can provide conferencing services. For example, conferencing system 120 can be an audio conferencing system and/or a video conferencing system. Conferencing system 120 further comprises Interactive Voice Response (IVR) system 121, mixer 122, conference manager 123, and schedule manager 124.

IVR system 121 can be any hardware/software that allows a user to interact via an audio response. IVR system 121 can allow the user to audibly indicate information that can be used by conferencing system 120. For example, IVR system 121 can be used to get a participant or host code from the user. IVR system 121 can also provide information to the user that allows the user to navigate IVR system 121. IVR system 121 can also provide information such as progress messages, menus, and the like. IVR system 121 is shown as part of conferencing system 120; however, IVR system 121 can be separate from conferencing system 120.

Mixer 122 can be any hardware/software that can mix streams of the conference. Mixer 122 can mix audio streams, video streams, and/or a combination of both. Mixer 122 can mix all the audio and/or video streams and/or a portion of the audio/video streams. Mixer 122 is shown as part of conferencing system 120; however, mixer 122 can be separate from conferencing system 122. For example, mixer 122 may be in a distributed network.

Conference manager 123 can be any hardware/software that can communicate with communication device 101A. Schedule manager 124 can be any hardware/software system that can manage schedules. For example, schedule manager 124 can be an email system, a scheduling system, application that can manage schedule information and the like.

A communication is initiated between communication device 101A and conferencing system 120. For example, a user of communication device 101A calls conferencing system 120 to join an audio conference. Alternatively, conferencing system 120 can call communication device 101A. Conference manager 123 detects that the communication has been initiated (i.e., by detecting a Session Initiation Protocol (SIP) INVITE message received at conferencing system 120). Conference manager 123 identifies a user of conferencing system 120. Conference manager 123 can identify the user in various ways. For example, conference manager 123 can determine the user from a caller ID that was sent as part of a call connect message or SIP INVITE. Other ways can include looking at an Automatic Number Identification (ANI) that was sent, detecting an address (e.g., an Internet Protocol (IP) address), from a voice print that was sent by application 103, from a digital certificate sent from application 103, by an access code provided to IVR system 121 or provided to application 103, and the like. Identifying the user can also include identifying that the user is scheduled to join a conference on conferencing system 120.

In response to identifying the user of conferencing system 120, conference manager 123 gets from schedule manager 124 a list of conferences in which the user is scheduled to participate. The list of conferences may contain one or more conferences. Conference manager 123 sends the list of conferences to application 103 in communication device 101A.

Application 103 receives the list of conferences. Application 103 displays the list of conferences via user interface 102 to the user of communication device 101A. The user selects one of the conferences from the list of conferences in user interface 102. Application 103 detects the selection identifying the selected conference. Application 103 sends information identifying the selected conference to conferencing system 120.

Conference manager 123 receives the information identifying the selected conference. In response to receiving the information identifying the selected conference, conference manager 123 connects communication device 101A to the conference (e.g., a conference created by mixer 122 mixing audio communications from communication devices 101A-101C). Connecting the user to the conference can be done in various ways. For example, if the user is the first one to enter the conference, the user may be put on hold until the other participants in the conference join (e.g., users from communication devices 101B-101C). Another example would be to join the user to an existing conference with communication devices 101B and/or 101C. The conference can also include additional communication devices 101 (not shown).

Figure 2:
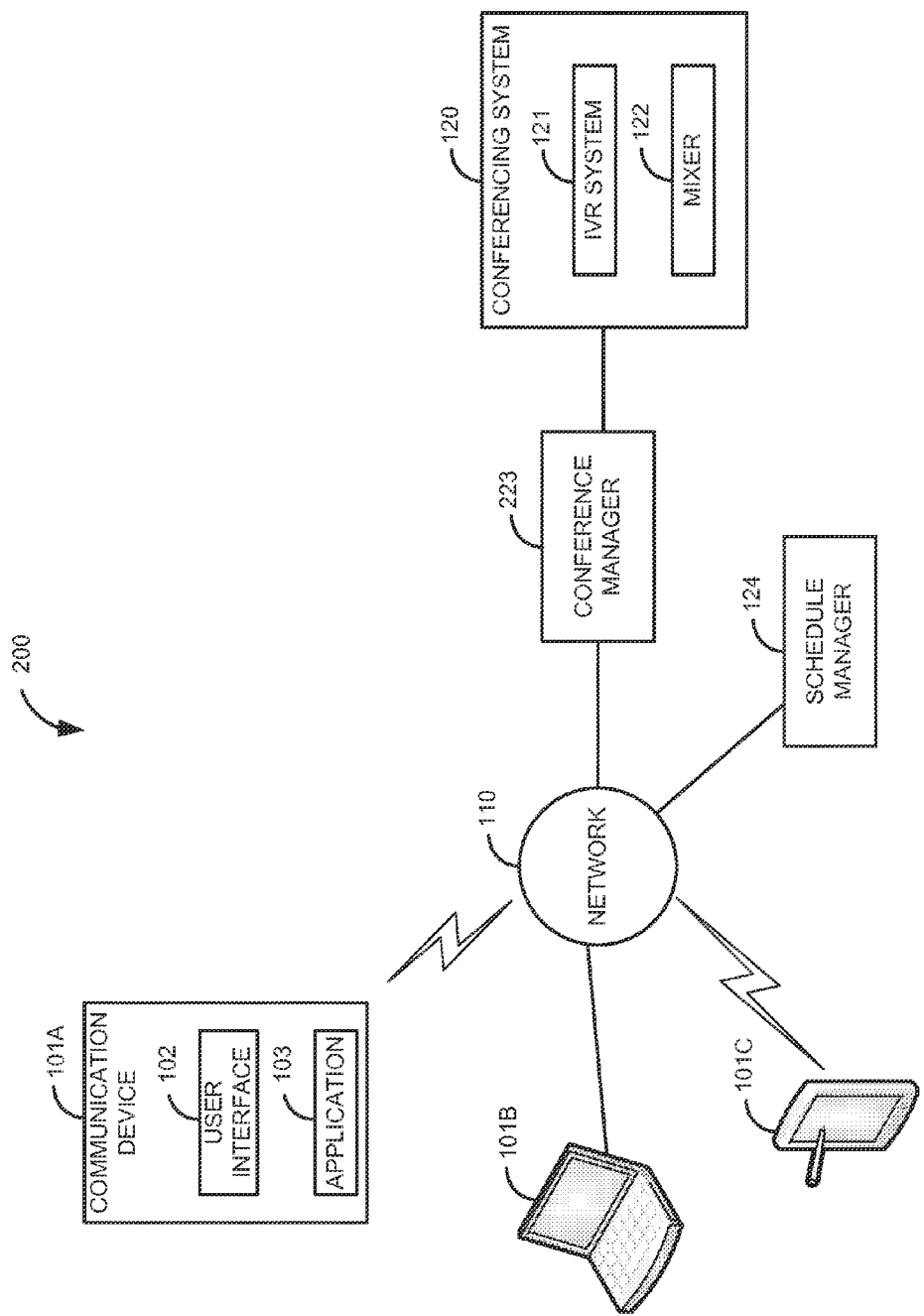
FIG. 2 is a block diagram of a second illustrative system for providing conferencing services.

FIG. 2 is a block diagram of a second illustrative system 200 for providing conferencing services. Second illustrative system 200 comprises communication devices 101A-101C, network 110, conferencing system 120, schedule manager 124, and conference manager 223. Conferencing system 120 further comprises IVR system 121 and mixer 122. In this embodiment, conference manager 223 is external to conferencing system 120 and can detect interactions between communication device 101A and conferencing system 120. For instance, conference manager 223 may be a Back-to-Back User Agent (B2B UA) that monitors Session Initiation Protocol (SIP) packets sent between communication devices 101A-101C and conferencing system 120.

A communication is initiated between communication device 101A and conferencing system 120. For example, a user of communication device 101A places a call to conferencing system 120 to join a video conference. Conference manager 223 detects that the communication has been initiated. Detecting that the communication has been initiated can be done in various ways. In one embodiment, conference manager 223 can detect the initiation of a communication by detecting a Session Initiation Protocol (SIP) INVITE. Other examples include conference manager 223 identifying a communication being established with conferencing system 120 or conference manager 223 can intercept call establishment packets and establish a communication directly with communication device 101A.

Conference manager 223 identifies a user of conferencing system 120. In response to identifying the user of conferencing system 120, conference manager 223 gets from schedule manager 124 a list of conferences that the user is scheduled to participate in. The list of conferences may contain one or more conferences. For example, if the user calls conferencing system 120 for a conference at 2:00 P.M., conference manager 223 gets a list that identifies a group meeting at 2:00 P.M. and a conference on medical procedures at 2:00 P.M.

In addition to information that identifies the conference, the list of conferences may also include information, such as the conference name, a host or participant code, that is used to join the conference, or other information about the conference. Conference manager 223 sends the list of conferences to application 103 in communication device 101A.

Application 103 receives the list of conferences. Application 103 displays the list of conferences via user interface 102 to the user of communication device 101A. The user selects one of the conferences from the list of conferences in user interface 102. Alternatively, the user could select two conferences (i.e., the user wants to join both and be connected to one while the other is on hold). Application 103 detects the selection(s) identifying the selected conference(s). Application 103 sends the information identifying the selected conference(s) to conference manager 223.

Conference manager 223 receives the information identifying the selected conference(s). In response to receiving the information identifying the selected conference(s), conference manager 223 connects communication device 101A to the conference(s). Connecting communication device 101A into the conference(s) can be done in various ways. For example, conference manager 223 can send audio messages to IVR system 121 that provides a host or participant code (that were provided by schedule manager 124) that IVR system 121 uses to join the user into the conference. Another alternative would be to send packets that identify which conference the user has selected.

When connecting the user to the conference, communication manager 223 can send one or more progress messages to application 103. For instance, communication manager 223 can send a progress message with a description that conference manager 223 is dialing conferencing system 120. Another progress message can contain a description that the user is being joined into the conference. Application 103 can display the progress messages to the user via user interface 102.

Figure 3:
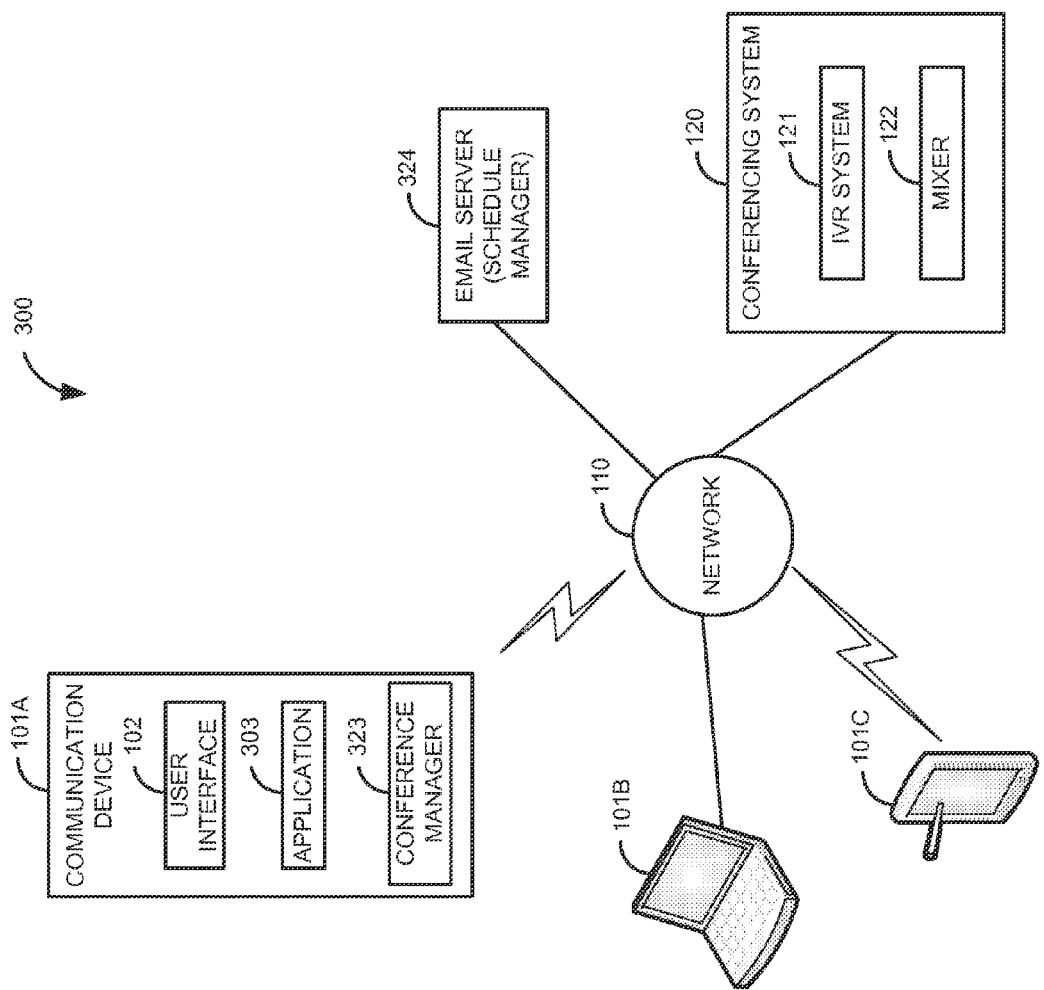
FIG. 3 is a block diagram of a third illustrative system for providing conferencing services.

FIG. 3 is a block diagram of a third illustrative system 300 for providing conferencing services. Third illustrative system 300 comprises communication devices 101A-101C, network 110, conferencing system 120, and email server 324. Communication device 101A comprises user interface 102, application 303, and conference manager 323. In this illustrative example, conference manager 323 resides in communication device 101A. Application 303 and conference manager 323 are shown as separate applications (or processes/threads). However, application 303 and conference manager 323 could be a single application and/or process. Conferencing system 120 further comprises IVR system 121 and mixer 122. Also, email server 324 is shown as an exemplary embodiment of schedule manager 124.

A communication is initiated between communication device 101A and conferencing system 120. Conference manager 323 detects that the communication has been initiated. Conference manager 323 identifies a user of conferencing system 120. In response to identifying the user of conferencing system 120, conference manager 323 gets from email server 324 a list of conferences in which the identified user is scheduled to participate. For example, email server 324 can get the list of conferences by getting the user's schedule from a calendaring application in email server 324. Conference manager 323 sends the list of conferences to application 303.

Application 303 receives the list of conferences. Application 303 displays the list of conferences via user interface 102 to the user of communication device 101A. The user selects one or more of the conferences from the list of conferences in user interface 102. Application 303 detects the selection identifying the selected conference. Application 303 sends information identifying the selected conference(s) to conferencing manager 323.

Conference manager 323 receives the information identifying the selected conference(s). In response to receiving the information identifying the selected conference(s), conference manager 323 connects communication device 101A to the conference(s). For example, conference manager 323 could send a SIP INVITE along with a participant code to join the conference. When connecting the user to the conference (s), communication manager 323 can send one or more progress messages to application 303. Application 303 can then display the progress messages to the user. The progress messages can be presented to the user based on receiving progress messages from conferencing system 120.

Figure 4:
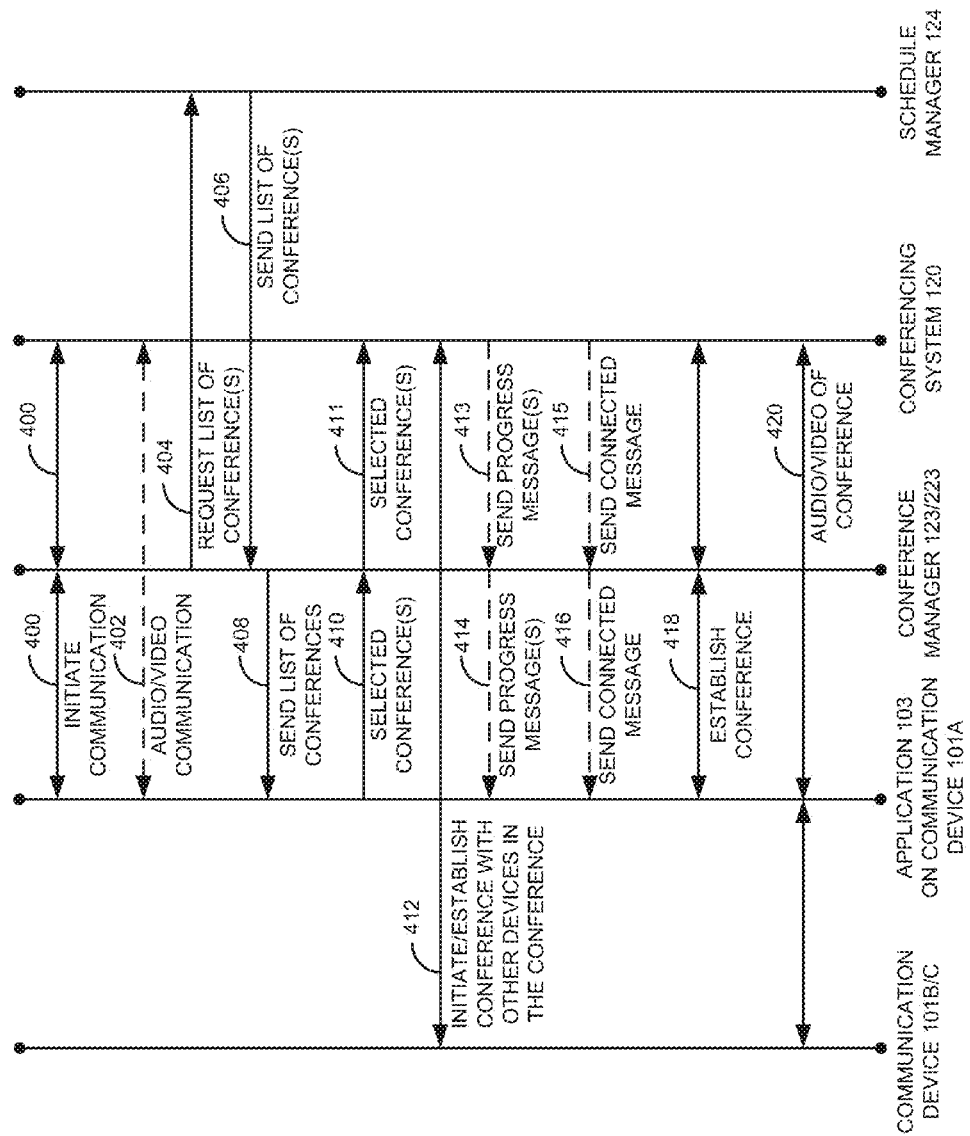
FIG. 4 is a flow diagram of a method for providing conferencing services.
Figure 5:
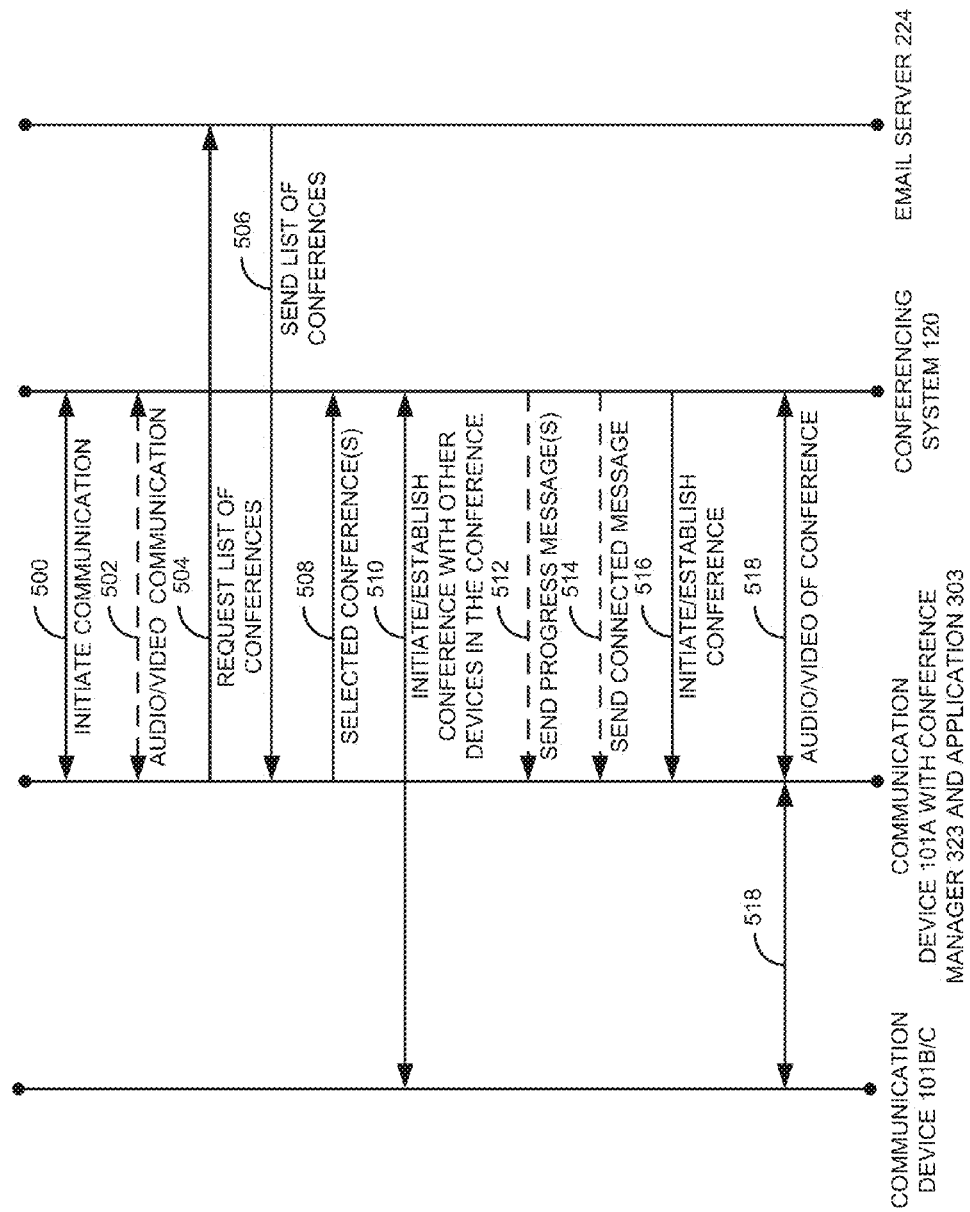
FIG. 5 is a flow diagram of a method for providing conferencing services.

FIG. 4 is a flow diagram of a method for providing conferencing services. FIG. 4 is an exemplary flow diagram that illustrates the process described in FIGS. 1-2. Illustratively, communication devices 101A-101C, applications 103/303, conferencing system 120, conference manager (123, 223, and 323), schedule manager 124/324, IVR system 121, and mixer 122 are stored-program-controlled entities, such as a computer or processor, which perform the method of FIGS. 4-5 and the processes described herein by executing program instructions stored in a tangible computer readable storage medium, such as a memory or disk. FIGS. 4-5 describe a basic method for implementing various embodiments of the invention. As one of ordinary skill in the art would recognize, certain elements, such as the full call establishment process, and responses, such as acknowledgment packets, are not shown for simplicity.

The process begins in step 400 when a communication is initiated between communication device 101A and conferencing system 120. The initiation of the communication can be in the form of a packet sent to conferencing 120 and/or conference manager 123/223. For example, a communication can be initiated by sending a Session Initiation Protocol (SIP) INVITE message from communication device 101A to conferencing system 120. Alternatively, conference manager 223 could intercept the SIP INVITE. An audio/video communication channel can optionally be established 402 between communication device 101A and conferencing system 120. For example, an audio communication channel using Real-Time Protocol (RTP) can be established between IVR system 121 and communication device 101A.

Conference manager 123/223 identifies the user of the conference. For example, conference manager 123/223 can identify the user via Caller ID. Conference manager 123/223 requests 404 the list of conference(s) for the identified user from schedule manager 124. Schedule manager 124 sends 406 the list of conference(s) to conference manager 123/223. Conference manager 123/223 sends 408 the list of conferences to application 103.

Application 103 displays the list of conferences to the user via user interface 102. The user selects one (or more) of the conferences in user interface 102. Application 103 sends 410, information identifying the selected conference(s) to conference manager 123/223. The information identifying the selected conference is sent 411 to conferencing system 120. For example, the selected conferences sent in step 411 could be voice commands sent to IVR system 121 that provide a participant or host code to IVR system 121.

In the meantime, conferencing system 120 is establishing 412 the conference with other communication devices 101B-101C. Adding the other communication devices 101B-101C can be accomplished at other times depending on when communication devices 101B-101C join the conference.

As conferencing system 120 joins the user to the conference, conferencing system 120 can send progress messages in steps 413-414 that can be presented to the user. For instance, a dialing progress message can be sent in steps 413-414. Likewise, progress messages, such as a description of joining the conference, can be sent in steps 415-416. In addition, progress messages can also be sent via the audio/video communication (e.g., RTP stream) created in step 402. For example, audio versions of the progress messages can be provided via IVR system 121 in addition to the progress messages sent in steps 414-416. The user is provided with the progress messages visually from application 103 and audibly from IVR 121.

The conference is then established 418 with communication device 101A and conferencing system 120. For example, if an audio/video communication was established with IVR system 121 in step 402, the communication can be transferred from IVR system 121 to the conference with communication devices 101B-101C. The audio/video conference is then established 420 between all the communication devices 101A-101C. If a communication was established from communication device 101A to conference manager 123/223, conference manager 123/223 could connect communication device 101A into the conference. For example, by transferring the call from the conference manager 123/223 to conferencing system 120 by providing the necessary credentials, such as access codes, so the user is connected into the selected conference(s).

FIG. 5 is a flow diagram of a method for providing conferencing services. FIG. 5 is an exemplary flow diagram that is used for FIG. 3, where conference manager 323 is in communication device 101A. The process begins in step 500 when a communication is initiated between communication device 101A and conferencing system 120. An audio/video communication channel can optionally be established 502 between communication device 101A and conferencing system 120. For example, a video communication channel can be established between IVR system 121 and communication device 101A.

Conference manager 323 identifies the user of the conference. For instance, the user can be identified when the user authenticates to communication device 101A. Conference manager 323 requests 504 the list of conference(s) for the identified user from email server 324 (i.e., schedule manager 124). Email server 324 sends 506 the list of conference(s) to conference manager 323. Conference manager 323 sends the list of conference(s) to application 303.

Application 303 displays the list of conferences to the user via user interface 102. The user selects one (or more) of the conferences in user interface 102. Application 303 sends information identifying the selected conference(s) to conference manager 323. The information identifying the selected conference is sent 508 from conference manager 323 to conferencing system 120. For example, conference manager 323 could send the information as audio or Dual-Tone Multi-Frequency (DTMF) signaling.

In the meantime, conferencing system 120 establishes 510 the conference with other communication devices 101B-101C. Adding the other communication devices 101B-101C can be accomplished at other times depending on when communication devices 101B-101C join the conference.

As conferencing system 120 joins the identified user to the conference, conferencing system 120 can optionally send progress messages, such dialing and connect messages, in steps 512 and 514 that can be presented to the user by application 303 via user interface 102. The conference is then established 516 with communication device 101A and conferencing system 120. The audio video conference is then established 518 between all communication devices 101A-101C.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
in a conference manager of a conferencing system, detecting that a communication has been initiated between a communication device and the conferencing system;
in the conference manager, in response to detecting the communication initiation, identifying a user of the communication device and the conferencing system and generating a corresponding user identifier;
in the conference manager, responsive to identifying the user of the conferencing system, using the user identifier to get a list of conferences in which the user is scheduled to participate, wherein the list of conferences comprises one or more conferences;
in the conference manager, sending the list of conferences to an application running on the communication device in response to identifying the user;
in the conference manager, receiving from the application on the communication device, information identifying a selected conference; and
in the conference manager, responsive to receiving the information identifying the selected conference, connecting the communication device into the selected conference.

2. The method of claim 1, wherein detecting that the communication has been initiated is accomplished external to the conferencing system.

3. The method of claim 1, further comprising the step of sending one or more progress messages to the application.

4. The method of claim 3, wherein the one or more progress messages comprise at least one of the following:
a description of dialing the conferencing system; and
a description of joining the selected conference.

5. The method of claim 3, wherein the one or more progress messages are used to present a text message to the user and further comprising the step of sending one or more audio progress messages to the communication device, wherein the one or more audio progress messages are an audio version of the one or more progress messages and the one or more audio progress messages are sent from an Interactive Voice Response System (IVR).

6. The method of claim 1, further comprising the steps of:
   receiving the list of conferences at the application in the communication device;
   the application displaying the list of conferences to the user in a user interface;
   the application detecting a selection by the user identifying the selected conference; and
   the application sending the information identifying the selected conference to the conference manager.

7. The method of claim 1, wherein identifying the user of the conferencing system is accomplished using at least one of the following: a caller ID, an Automatic Number Identification (ANI), an address, a voice print, a digital certificate, an access code, and an entry in a calendaring system.

8. A method comprising:
   in a conference manager of a communication device, detecting that a communication has been initiated between the communication device and a conferencing system;
   in the conference manager, in response to detecting the communication initiation, identifying a user of the communication device and the conferencing system and generating a corresponding user identifier;
   in the conference manager, responsive to identifying the user of the conferencing system, using the user identifier to get a list of conferences in which the user is scheduled to participate, wherein the list of conferences comprises one or more conferences;
   in an application in the communication device, presenting the list of conferences to the user in a user interface in response to the conference manager identifying the user;
   in the application, getting an indication of a selected conference from the user interface; and
   in the application, sending information identifying the selected conference to the conference manager.

9. The method of claim 8, wherein the sent information identifying the selected conference uses audio or Dual-Tone Multi-Frequency (DTMF) signaling.

10. The method of claim 8, further comprising the steps of:
    in the conference manager, receiving one or more progress message that indicate at least one of dialing the conferencing system and joining the selected conference; and
    in the application, presenting the one or more progress messages to the user in the user interface.

11. A system comprising:
    a conference manager configured to detect that a communication has been initiated between a communication device and a conferencing system, identify a user of the communication device and the conferencing system in response to detecting the communication initiation and generate a corresponding user identifier, responsive to identifying the user of the conferencing system, use the user identifier to get from a schedule manager, a list of conferences in which the user is scheduled to participate, wherein the list of conferences comprises one or more conferences, sending the list of conferences to an application running on the communication device in response to identifying the user, receive from the application on the communication device information identifying a selected conference; and responsive to receiving the information identifying the selected conference, connecting the communication device into the selected conference.

12. The system of claim 11, wherein detecting that the communication has been initiated is accomplished external to the conferencing system.

13. The system of claim 11, wherein the conference manager is further configured to send one or more progress messages to the application.

14. The system of claim 13, wherein the one or more progress messages comprise at least one of the following:
    a description of dialing the conferencing system; and
    a description of joining the selected conference.

15. The system of claim 13, wherein the one or more progress messages are used to present a text message to the user and further comprising:
    an Interactive Voice Response (IVR) system configured to send one or more audio progress messages to the communication device, wherein the one or more audio progress messages are an audio version of the one or more progress messages.

16. The system of claim 11, wherein the application is further configured to receive the list of conferences, display the list of conferences to the user in a user interface, detect a selection by the user identifying the selected conference, and send the information identifying the selected conference to the conference manager.

17. The system of claim 11, wherein identifying the user of the conferencing system is accomplished using at least one of the following: a caller ID, an Automatic Number Identification (ANI), an address, a voice print, a digital certificate, an access code, and an entry in a calendaring system.

18. A communication device comprising:
    a conference manager configured to detect that a communication has been initiated between the communication device and a conferencing system, identify a user of the communication device and the conferencing system in response to detecting the communication initiation and generate a corresponding user identifier, responsive to identifying the user of the conferencing system, use the user identifier to get a list of conferences that the user is scheduled to participate in, wherein the list of conferences comprises one or more conferences; and
    an application configured to present the list of conferences to the user in a user interface in response to the conference manager identifying the user, get an indication of the selected conference from the user interface, and send information identifying the selected conference to the conference manager.

19. The communication device of claim 18, wherein the sent information identifying the selected conference uses audio or Dual-Tone Multi-Frequency (DTMF) signaling.

20. The communication device of claim 18, wherein the conference manager is further configured to receive one or more progress message that indicates at least one of dialing the conferencing system and joining the selected conference, and the application is further configured to present the one or more progress messages to the user in the user interface.

* * * * *